United States Patent Office 2,901,314
Patented Aug. 25, 1959

2,901,314

REMOVAL OF URANIUM FROM ORGANIC LIQUIDS

Spears P. Vavalides, Oak Ridge, Tenn., assignor to the United States of America as represented by the United States Atomic Energy Commission No Drawing. Application March 22, 1950
Serial No. 151,301

15 Claims. (Cl. 23—14.5)

My invention relates to a method for recovering uranium and more particularly to the removal of extremely small quantities of uranium values from organic liquids.

In certain processes involving the handling of relatively large quantities of uranium as uranium fluorides, small but valuable quantities of uranium values sometimes seep from the process stream into various organic liquids which are associated with process connected functions such as vacuum pumping, washing, cooling, and lubrication. In practice, these organic liquids sometimes comprise various hydrocarbon oils, Freons, methanol, kerosene, trichloroethylene, carbon tetrachloride and the like. The uranium content of these organic liquids, after various periods of use, is often found to average approximately 80 to approximately 100 parts per million of uranium by weight and sometimes ranges from approximately 15 to approximately 5000 parts per million uranium by weight.

Various attempts have been made to remove in recoverable form the uranium known to exist in these organic liquids. These methods have included burning the organic liquids and recovering the uranium oxides remaining in the residues by conventional methods; or by diluting these organic liquids with petroleum ether or other suitable diluents, filtering the resulting mixtures, and recovering as solid residues that part of the uranium which may have been dispersed in the organic liquids in insoluble form, for example, as $UF_4$. These methods were found to be unsatisfactory due to high uranium losses.

An object of my present invention is to provide a process for removing uranium from neutral organic liquids.

Another object of my invention is to provide a process for achieving the substantially quantitative removal of extremely small quantities of uranium from the above organic liquids.

A further object is to provide a process for effecting the removal of extremely small quantities of uranium from the above organic liquids in such manner as to be readily recoverable by well known and conventional means.

Additional objects and advantages of my invention will be apparent from the following description.

In accordance with my present invention, substantially complete removal of uranium from neutral organic liquids may be effected by slurrying these liquids with a solid alkaline earth hydroxide, separating the resulting uranium-containing solid phase from the supernatant liquid, and recovering the uranium from the separated solid phase by conventional means.

In general, any uranium values which are present in the neutral organic liquids in amounts ranging up to approximately 5 parts per thousand uranium by weight in soluble and/or relatively finely dispersed particulate form may be effectively removed by my process. I find, however, that my invention is particularly suited for the removal of halogenated uranium values, and more particularly for the removal of uranium fluorides. The term "uranium fluorides," as used in this specification and in the claims appended thereto is intended to include, not only those compounds containing solely uranium and fluorine, but also uranium oxyfluorides and other poly-elemental inorganic compounds containing uranium and fluorine. In more detail, for example, I find that I may quantitatively remove uranium which may be present as $UF_6$, $UO_2F_2$, or $UF_4$ or in any combination of these. Thus, in a particular process utilizing $UF_6$, small quantities of $UF_6$ may seep into the herein described organic liquids. Some of these liquids, particularly hydrocarbon oils, tend to have a reducing effect on the $UF_6$, converting part or all of the $UF_6$ to $UF_4$. Any moisture content of the organic liquids may also react with part or all of the $UF_6$ to form $UO_2F_2$. The above two effects may be present together in widely varying degrees depending, of course, upon the nature of the specific neutral organic liquid and the amount of moisture available for reaction with the $UF_6$.

Although alkaline earth hydroxides, in general, including strontium, barium, and magnesium hydroxides, may be satisfactorily utilized in effecting my invention, calcium hydroxide, from the standpoint of availability, economic feasibility and unusually excellent results, is greatly preferred. For this reason, the following more detailed description will be directed towards the utilization of calcium hydroxide.

Although my invention may be employed to treat substantially all neutral organic liquids for satisfactory uranium removal, I find that very good results may be obtained with certain classes of neutral organic liquids, namely, those consisting of hydrocarbons, halogenated hydrocarbons and alcohols. Within these classes, I find that particularly good results may be obtained with petroleum hydrocarbon fractions, aliphatic alcohols, and halogenated hydrocarbons containing one or two carbon atoms. Excellent results have been obtained utilizing numerous specific materials selected from the above subclasses, for example, lubricating oils, kerosene, methanol, trifluorotrichloroethane, trichloroethylene, and carbon tetrachloride.

Although the size of the solid calcium hydroxide particles which may be added to the herein described organic liquids in accordance with my invention is not critical, I find that a mesh size of approximately 200 is preferred. This mesh size appears to provide an optimum combination of fast reaction time versus subsequent ease of separation of the $Ca(OH)_2$ from the liquids being treated. However, mesh sizes ranging from 100–400 may be satisfactorily utilized.

The ratio of solid $Ca(OH)_2$ to the organic liquids being treated for uranium removal is also not critical, but is limited by the degree of interference of large amounts of solids, arising from the addition of the solid $Ca(OH)_2$, that may be tolerated by process mechanics and also by the degree of the subsequently decreased efficiency of the recovery of uranium from the resulting greater proportion of solids. Thus, I find, for example, that a range of ratios, by weight, from approximately 5 to approximately 15 parts of liquid to 1 part of solid $Ca(OH)_2$ may be satisfactorily handled, though I generally prefer to use approximately 10 parts of liquid to one part of solid $Ca(OH)_2$ by weight.

In separating the solid from the liquid phase in my invention, I find that it is particularly advantageous to raise the temperature of the slurry before utilizing a phase separation step, such as filtration. The raised temperature results in a lowered viscosity of the liquid and permits much more efficient dispersion of the $Ca(OH)_2$ particles by stirring means and also a subsequently easier separation of the two phases. A temperature of approximately 100° F. is generally found to provide close to optimum dispersion and phase separation rates when using the herein described organic liquids.

The reaction time for attaining maximum uranium removal from the liquid phase by solid $Ca(OH)_2$ will, of course, depend on factors such as size of the $Ca(OH)_2$ particles, speed of dispersion of the solid $Ca(OH)_2$ particles, the particular organic liquid being treated, etc. When employing the preferred reaction conditions, as discussed above, suitable reaction times are from 20 minutes to 1 hour, with a reaction time of about 30 to 45 minutes generally being preferred. In any event, an optimum time can be determined for any chosen set of reaction conditions by routine chemical testing methods.

Although my invention is particularly suited for the removal of approximately 15 to approximately 200 parts per million of uranium, I find that as much as approximately 5000 p.p.m. of uranium may be satisfactorily removed from the herein described organic liquids.

In carrying out the removal of uranium in accordance with my invention, approximately 100 to 400 mesh solid $Ca(OH)_2$ is added to an organic liquid of the kind described herein, in the ratio of approximately 1 part $Ca(OH)_2$ to 10 parts organic liquid by weight. The solid $Ca(OH)_2$ may then be dispersed by heating to approximately 100° F. and stirring for approximately ⅓ hr. to 1 hr. The solid $Ca(OH)_2$, now containing substantially all of the uranium which was originally in the liquid phase, may be separated from the liquid phase by conventional filtration means. The resulting cake may then be washed with a suitable organic solvent to remove remaining traces of the organic liquid from which the uranium is being removed.

After treating various neutral organic liquids in accordance with the above procedure, I find that they generally contain less than ½ part per million uranium by weight; the value of ½ part per million being the detectable limit of the available analytical methods. This degree of recovery of such low concentrations of an element represents an unexpected and unusual result. Moreover, the separated solid, which is essentially a hydroxide cake containing relatively small quantities of uranium values, may be easily dissolved in nitric acid solution, the resulting calcium nitrate in solution serving as a salting agent for a subsequent extraction of the uranium from the solid cake by means of organic solvents such as dibutyl Carbitol, dibutyl Cellosolve, hexone, diethyl ether, and the like, or by means of a mixture of a uranium complexing agent, such as tributyl phosphate, with any of the above solvents. Among such extracting agents I find that a mixture of dibutyl Carbitol and tributyl phosphate is generally preferred. The uranium may then be easily re-extracted with water.

Such conventional recovery methods may be utilized to substantially quantitatively remove the uranium from the solid cake produced by the process of my invention. However, I find that it is economically more feasible to combine the above nitric acid solution of the cake with other solutions that are considerably richer in uranium content and which are also to be processed by one of the above organic extraction procedures.

The following specific examples illustrate my invention in greater detail:

*Example I*

Forty-five pounds of approximately 200 mesh, technical grade solid $Ca(OH)_2$ were added to 430 lbs. of a petroleum vacuum pumping and lubricating oil (pour point 20° F., flash point 410° F., viscosity 30 seconds at 100° F., viscosity index 105, neutrality number 0.05) which contained approximately 80 p.p.m. uranium, presumably in the form of uranium fluorides, and the solid $Ca(OH)_2$ was dispersed in the oil by heating to 100° F. and agitating. The $Ca(OH)_2$ dispersed in approximately 20 minutes and the slurry was filtered while still at 110° F. through a filter press. The filtrate was clear and the uranium analysis of the filtrate was less than ½ p.p.m. The cake was given five washes with 100 gals. of trichlorethylene to remove the last traces of oil, and was then dried. The trichlorethylene wash was analyzed for uranium and contained less than ½ p.p.m.

The uranium was then recovered from the cake by a conventional extraction method which involved dissolution of the cake in $HNO_3$, adjustment of the resulting solution to a pH of 0.5 and a specific gravity of 1.4, followed by extraction with a mixture of 75% dibutyl Carbitol and 25% tributyl phosphate. Analysis indicated that effectively 100% of the uranium had been recovered in the organic phase.

*Example II*

The procedure of Example I was followed except that 430 lbs. of trifluorotrichloroethane (Freon-113) containing 206 p.p.m. uranium, presumably in the form of uranium fluorides, and 60 lbs. of approximately 200 mesh technical grade solid $Ca(OH)_2$ were utilized. The same uranium recoveries indicated in Example I were achieved in the present example.

*Example III*

The procedure of Example I was followed except that 237 liters of carbon tetrachloride containing 50 p.p.m. uranium, presumably in the form of uranium fluorides, and 80 lbs. of approximately 200 mesh technical grade solid $Ca(OH)_2$ were utilized. The uranium recoveries were the same as those achieved in Example I.

*Example IV*

The procedure of Example I was followed except that 379 lbs. of the same oil containing 3150 parts per million uranium, presumably in the form of uranium fluorides, and 35 lbs. of approximately 200 mesh technical grade solid $Ca(OH)_2$ were utilized. The uranium recoveries were the same as those achieved in Example I.

In general, it may be said that the above examples are merely illustrative and should not be construed as limiting the scope of my invention. Numerous other neutral organic liquids containing uranium values may be treated with various alkaline earth hydroxides for the removal of uranium within the scope of the foregoing description. The scope of my invention should be understood to be limited only as indicated by the appended claims.

I claim:

1. A process for removing uranium values from a neutral organic liquid which comprises intimately contacting said liquid with a comminuted solid alkaline earth hydroxide and thereafter separating the resulting uranium-containing solid phase from the substantially uranium-free liquid phase.

2. A process for removing uranium fluorides from a neutral organic liquid which comprises intimately contacting said liquid with a comminuted solid alkaline earth hydroxide and thereafter separating the resulting uranium-containing solid phase from the substantially uranium-free liquid phase.

3. A process for removing uranium fluorides from a neutral organic liquid which comprises intimately contacting said liquid with comminuted solid calcium hydroxide and thereafter separating the resulting uranium-containing solid phase from the substantially uranium-free liquid phase.

4. A process for removing uranium fluorides from a liquid hydrocarbon which comprises intimately contacting said liquid with comminuted solid calcium hydroxide and thereafter separating the resulting uranium-containing solid phase from the substantially uranium-free liquid phase.

5. A process for removing uranium fluorides from a liquid halogenated hydrocarbon which comprises intimately contacting said liquid with comminuted solids calcium hydroxide and thereafter separating the resulting uranium-containing solid phase from the substantially uranium-free liquid phase.

6. A process for removing uranium fluorides from a liquid alcohol which comprises intimately contacting said liquid with comminuted solid calcium hydroxide and thereafter separating the resulting uranium-containing solid phase from the substantially uranium-free liquid phase.

7. The process of claim 4 in which the liquid hydrocarbon is a petroleum fraction.

8. The process of claim 5 in which the liquid halogenated hydrocarbon is a compound containing one carbon atom.

9. The process of claim 5 in which the liquid halogenated hydrocarbon is a compound containing two carbon atoms.

10. The process of claim 6 in which the liquid alcohol is an aliphatic alcohol.

11. A process for removing uranium fluorides from carbon tetrachloride which comprises intimately contacting the carbon tetrachloride with comminuted solid calcium hydroxide and thereafter separating the resulting uranium-containing solid phase from the substantially uranium-free liquid phase.

12. A process for removing uranium fluorides from trifluorotrichloroethane which comprises intimately contacting the trifluorotrichloroethane with comminuted solid calcium hydroxide and thereafter separating the resulting uranium-containing solid phase from the substantially uranium-free liquid phase.

13. A process for removing uranium fluorides from a petroleum hydrocarbon oil which comprises intimately contacting said oil with comminuted solid calcium hydroxide and thereafter separating the resulting uranium-containing solid phase from the substantially uranium-free liquid phase.

14. A process for removing uranium fluorides from kerosene which comprises intimately contacting the kerosene with comminuted solid calcium hydroxide and thereafter separating the resulting uranium-containing solid phase from the substantially uranium-free liquid phase.

15. A process for removing uranium fluorides from methanol which comprises intimately contacting the methanol with comminuted solid calcium hydroxide and thereafter separating the resulting uranium-containing solid phase from the substantially uranium-free liquid phase.

No references cited.